May 9, 1939.  N. S. BORCH  2,157,254
PROCESS FOR ROASTING MATERIALS RICH IN SULPHUR
Filed Jan. 4, 1938.
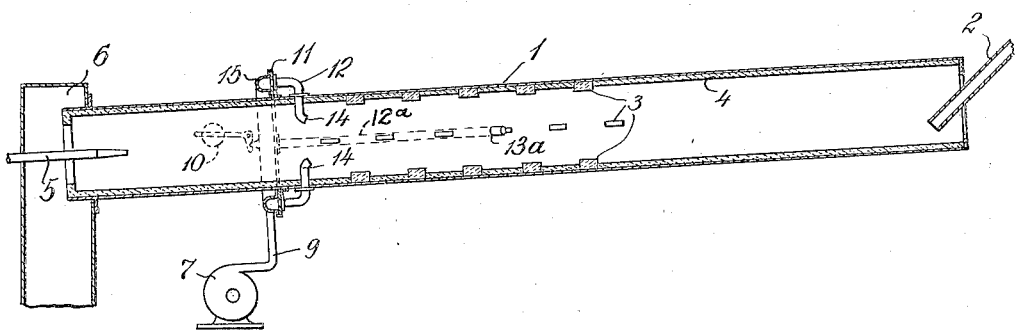
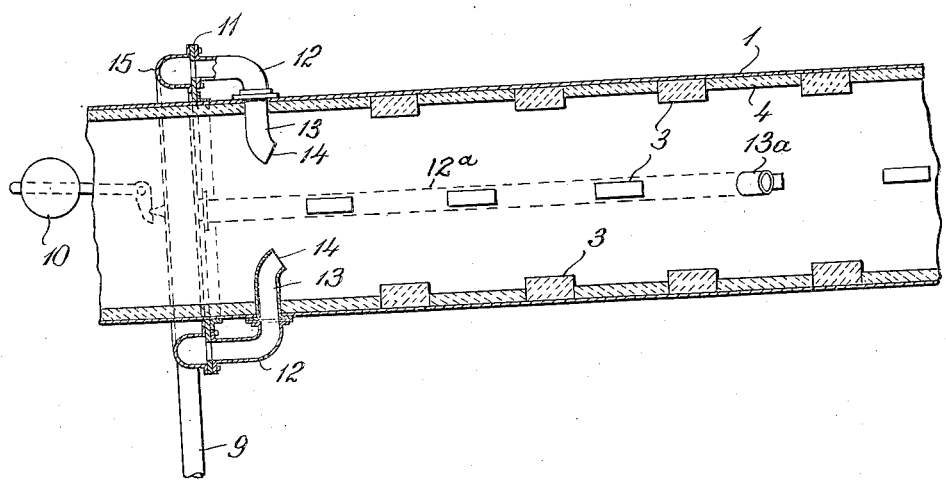
INVENTOR
Niels Sofus Borch
BY
Pennie Davis Marvin Edmonds
ATTORNEYS Patented May 9, 1939

2,157,254

UNITED STATES PATENT OFFICE 2,157,254

PROCESS FOR ROASTING MATERIALS RICH IN SULPHUR

Niels Sofus Borch, Copenhagen, Denmark, assignor to F. L. Smidth & Company, New York, N. Y., a corporation of New Jersey Application January 4, 1938, Serial No. 183,250
In Great Britain January 8, 1937

6 Claims. (Cl. 75—7)

This invention relates to the desulphurization of nickel matte, and is concerned more particularly with a novel method by which such material may be substantially completely desulphurized in a continuous uninterrupted operation.

In the desulphurization of nickel matte by roasting the materials are likely to be heated to such a high temperature by the combustion of the sulphur that they become soft and sticky, and may even become fluid. As the material treated is in a fine-grained condition, it tends to form lumps when it becomes sticky, and as a result, the remaining sulphur can only be expelled slowly. In order to overcome this difficulty, it has been usual to remove the material from the furnace, cool it, and reduce the lumps to a fine powder again. The material is then introduced again into the furnace and the desulphurizing process is continued without difficulty, as by this time the sulphur content is so low that there is no risk of agglomeration. This method is expensive, because the material must be subjected to an extra grinding process and furthermore the heat given up during the cooling is lost.

An important object of the invention is to provide a method of preventing the risk of partial melting and agglomeration of nickel matte in the desulphurization thereof.

Another object of the invention is to desulphurize nickel matte economically and without the necessity of an intermediate grinding process.

A further object of the invention is to desulphurize nickel matte substantially completely in a continuous process in a rotary kiln.

I have found that if unroasted matte is mixed with roasted matte to give a mixture lower in sulphur than the unroasted matte, the risk of partial melting is reduced. The ratios in which the two mattes are mixed depends, of course, upon their sulphur contents, but it may advantageously be such as to reduce the sulphur content of the mixture to the order of 8%. By mixing the two materials in this way, the average melting point of the charge is raised because of the lower sulphur content and the average temperature attained by the material during the combustion of the sulphur is reduced, because less sulphur is burnt away. Both these factors are of value in avoiding partial melting.

In the mixture, some of the grains contain more sulphur than others and will have a lower melting point. During the roasting, therefore, these grains of higher sulphur content tend to stick to the surfaces of the grains of low sulphur content, and this produces a very large reaction surface between the hot gases and the materials that contain most sulphur. The material, accordingly, consists of grains with a core free or substantially free from sulphur and a surface containing a relatively large quantity of sulphur that easily becomes sticky on heating. Such a material, therefore, has good dust-catching properties, which is desirable as the dust from nickel matte is valuable.

It is difficult, if not impossible, to effect complete desulphurization by simply roasting a mixed matte, since at the end of the roasting proper, there is generally a residue of less than 1% of sulphur in the roasted material. The reason for this is that the remainder of the sulphur is mainly or partly present as sulphate formed from the sulphide during the roasting process, and that the roasting process has to be carried out in the presence of an ample supply of oxygen in order to oxidise the sulphur to sulphur dioxide. Since the heating is generally effected by means of combustion gases, a substantial quantity of air has to be supplied in order to provide the necessary oxygen, so that in practice the temperature of the material does not exceed 1000° C. which is not high enough to effect complete desulphurization, as the sulphate cannot be driven out at this temperature. Moreover, if the temperature is raised beyond this value while the material still contains a substantial quantity of sulphur, there is a considerable risk of melting the material. In order to effect further desulphurization, the roasting is followed by heating at a higher temperature, i. e. from about 1100 to 1300° C. or more. As the sulphur content has been reduced in the first part of the treatment to about 1%, there is no danger of any melting occurring at these relatively high temperatures. Again, this low sulphur content of the material makes it unnecessary to carry out the process in the presence of any great excess of oxygen, so that the heat may conveniently be supplied by means of combustion gases diluted with a relatively small quantity of excess air.

The two stages of the treatment forming the process of the invention may be carried out in a continuous manner in a single rotary kiln through which the material to be roasted and the combustion gases are led in counterflow. The gases entering the kiln at its outlet end contain only a small excess of air so that the temperature will attain a value varying from about 1100° C. to about 1300° C. and sufficiently high to lead to complete desulphurization. Air is admitted at one or more points through the kiln shell so that the advancing gases are both diluted with air and reduced in temperature, thus avoiding the risk of melting the material comparatively rich in sulphur at the inlet end and ensuring that there shall be a sufficient excess of oxygen present to oxidise the sulphur.

In order better to explain how the two stages of the new process can be carried out in one continuous process, one apparatus for carrying out the process is shown diagrammatically on the accompanying drawing in which Figure 1 shows a longitudinal section of a rotary kiln for the treatment of nickel matte in accordance with the process of the invention.

Figure 2 shows on a larger scale a section of the same rotary kiln from which the device for the supply of air will appear more clearly.

In the apparatus illustrated, the material is supplied to the rotary kiln 1 through the pipe 2, and it travels in counterflow to the gases through the kiln which is arranged in slightly inclined position. Within the kiln are lifters 3 which may consist of projections from the lining 4 of the kiln. By means of these lifters the material will be lifted and fall through the hot oxidising gases whereby a large reaction surface is obtained between the material and the gases.

The air for the combustion is admitted to the kiln partly as primary air through the burner pipe 5, partly as secondary air through the chamber 6. This air is supplied in definite quantities so that the combustion of the fuel at the outlet end of the kiln takes place with little or no excess air. By means of the fan 7, the quantity of air necessary for the oxidising process and for the cooling of the burning gases is supplied to the kiln.

From the fan 7a pipe 9 leads to the annular hood 15, which is stationary and forced by counter weights 10 against an annular plate 11 fixed to the kiln. Through the plate, the pipe lines 12 communicate with the hood 15, and the pipe lines are mounted on the kiln and connected to the nozzles 13 projecting into the kiln and extending so far that the outlets 14 thereof are always above the charge of material at the bottom of the kiln. It is not necessary to supply the total amount of air necessary for the oxidising process to one cross section of the kiln, but part of the air may also advantageously be admitted nearer the inlet end of the kiln through the nozzle 13a which receives air from the hood 15 through a pipe 12a leading from an opening in the plate 11.

As an example of the results obtained by the new process, nickel matte containing 24% of sulphur was mixed with already desulphurized nickel matte, so that the average sulphur content was reduced to about 8%. The mixture was ground in a mill to a fineness corresponding to 10% residue on the 170–180 mesh sieve. The process was carried on in a rotary kiln and the content of pure oxygen in the gases leaving the kiln was between 10 and 15%. During the roasting process the material was heated to 1000° C., and the sulphur content was diminished to 0.8%. During the final desulphurization process, the material was heated to 1300° C. and the sulphur content was diminished to 0.015%.

I claim:

1. In the desulphurization of nickel matte, the steps of introducing into a rotary kiln a mixture of unroasted and roasted nickel matte, causing the matte to flow through the kiln in counterflow to hot gases, and raising the oxygen content of the gases between the inlet and outlet ends of the kiln.

2. In the desulphurization of nickel matte, the steps of forming a charge relatively low in sulphur by mixing roasted and unroasted nickel matte, reducing the sulphur content of said charge by heating it to a temperature in the order of 1000° C. in the presence of a substantial excess of oxygen, and thereafter eliminating substantially all the remainder of the sulphur by increasing the temperature of said charge to at least 1100° C., the heating of the matte at the successively higher temperatures being carried on in a continuous uninterrupted operation.

3. In the desulphurization of nickel matte, the steps of forming a charge relatively low in sulphur by mixing roasted and unroasted nickel matte, causing said charge to flow through a rotary kiln, causing hot gases to flow through said rotary kiln in counterflow to said charge, maintaining said charge at a temperature in the order of 1000° C. in the first part of said kiln, and raising the temperature of said charge to at least 1100° C. in the later part of said kiln.

4. A method of desulphurizing nickel matte which comprises mixing roasted and unroasted nickel matte to form a charge, advancing the charge through a heating chamber, heating the charge in its passage through the first part of the chamber in the presence of a substantial excess of oxygen and to a temperature high enough to reduce the sulphur content substantially but below the melting point of the material, and increasing the temperature of the charge during its passage through the remainder of the chamber to eliminate substantially all of the remainder of the sulphur, the heating at the increased temperature being carried without substantial excess of oxygen present.

5. A method for desulphurizing nickel matte which comprises continuously introducing into a rotary kiln a mixture of roasted and unroasted nickel matte, introducing fuel and air into the kiln at the outlet end, the gases of combustion flowing counter current to the matte, and introducing additional air into the kiln between the ends.

6. A method of desulphurizing nickel matte which comprises continuously introducing into a rotary kiln a mixture of roasted and unroasted nickel matte, introducing air into the kiln between the ends, heating the material between the point of air introduction and the kiln inlet end to a temperature sufficient to eliminate a substantial proportion of the sulphur but lower than the melting point of the material, and eliminating substantially all of the remainder of the sulphur by increasing the temperature of the material between the point of air introduction and the outlet end of the kiln.

NIELS SOFUS BORCH.